Jan. 13, 1931.　　　N. MAMBOURG　　　1,788,923
SHEET GLASS APPARATUS
Filed Oct. 6, 1926

Inventor
Nestor Mambourg
By Frank Fraser,
Attorney

Patented Jan. 13, 1931

1,788,923

UNITED STATES PATENT OFFICE

NESTOR MAMBOURG, OF LANCASTER, OHIO, ASSIGNOR TO LIBBEY-OWENS-FORD GLASS COMPANY, OF TOLEDO, OHIO, A CORPORATION OF OHIO

SHEET-GLASS APPARATUS

Application filed October 6, 1926. Serial No. 139,865.

The present invention relates to sheet glass drawing apparatus.

An important object of the invention is to provide in sheet glass drawing apparatus an improved type of shield.

Another object of the invention is to provide in sheet glass apparatus a receptacle containing a mass of molten glass and including means for continuously drawing a sheet from said mass of glass, and a metallic plate arranged on both sides of said sheet to protect the sheet from the heat and gases in and around the draw pot.

Still another object of the invention is to provide in a machine of this nature a solid metallic plate which may be dipped into the glass if desired to protect the sheet of glass from heat and gases.

Still a further object of the invention is to provide means for protecting the sheet from the fires of the cooling chamber and pot chamber, thus allowing these fires to run as desired, without affecting the sheet, to eliminate the present sheet coolers, which are thought to be the causes of many of the waves in the sheet, and to cause the glass to draw from beneath the surface.

A further object of the invention is to provide in a machine of this nature a shield which may be internally heated to assist in properly conditioning the glass before it is formed into a sheet.

Other objects and advantages of the invention will become more apparent during the course of the following description.

Figure 1:
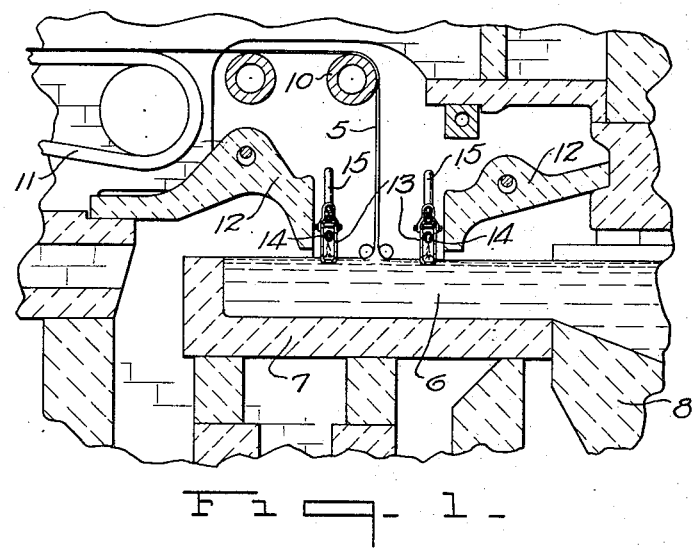
Figure 2:
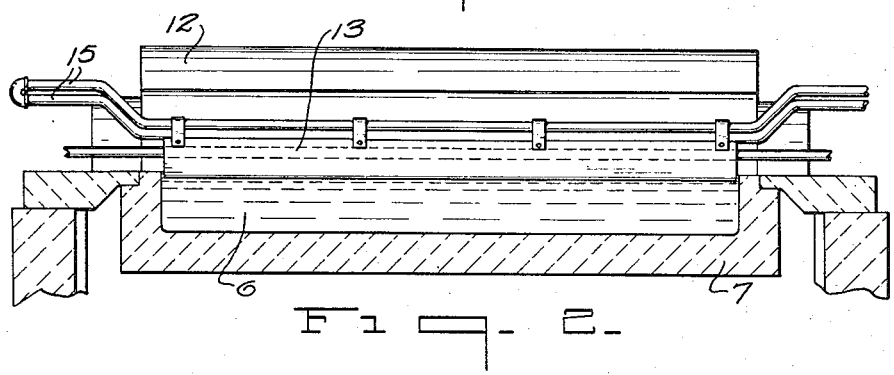
Figure 3:
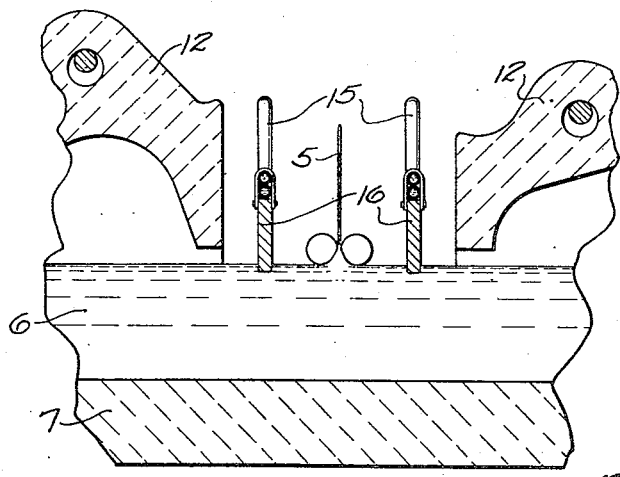
Figure 4:
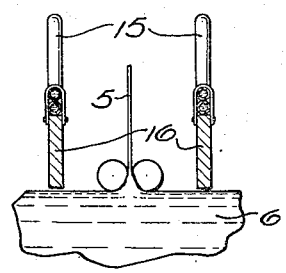

In the drawings wherein like numerals are employed to designate like parts throughout the same, Fig. 1 is a vertical longitudinal section through a sheet glass drawing machine illustrating one form of the invention in use, Fig. 2 is a transverse section through the apparatus, and Figs. 3 and 4 are fragmentary sections of slightly modified constructions.

The type of machine illustrated in the drawings is similar to the machine disclosed in the Colburn Patent No. 1,248,809, wherein a sheet of glass 5 is continuously drawn from a mass of molten glass 6 contained in a suitable draw pot 7 arranged in open communication with a tank furnace 8. The sheet 5 is drawn initially in a vertical plane, being held to width by the edge engaging means 9, the said sheet being deflected into a horizontal plane over a suitable bending member 10, after which it is moved over a drawing and flattening table 11.

Arranged over the molten glass 6 in the pot 7 are lip-tiles 12. It has been customary in the past to arrange a water cooler adjacent the lip-tiles, the lower edge of the cooler being disposed relatively close to the surface of the molten glass. These coolers have been used to protect the sheet in its vertical plane as much as possible from the heat and gases present in and around the draw pot and the tank furnace. Considerable difficulty has been had in the formation of a good sheet of glass because of the action of the water coolers upon the molten glass before it is drawn into sheet form. It is generally accepted that the slightest variation in the thickness of the walls of the coolers causes defects in the sheet. Due to the formation of sediment, etc., in these coolers, it is difficult to even approach a uniform treatment of the glass by the coolers the entire width of the flow of molten glass over which the coolers are arranged.

In accordance with the present invention the coolers are removed and metallic plates or shields are arranged in their place. In Fig. 1, the metallic shields 13 are formed to create a pocket therein in which suitable heating means 14 may be arranged to heat the same. The plates 13 may be formed from nickel, monel, nichrome, or some similar non-corrosive non-scaling metal. The shields may be supported upon the water cooled pipes or similar constructions 15, the cooling of the supports having no detrimental effect on the molten glass or sheet. The lower ends of the shields 13 are preferably dipped into the mass of molten glass so that the gases issuing from the furnace are effectively sealed and kept out of contact with the molten glass between the shields and the base of the sheet. The glass disposed between the shields and passing into the sheet will be in a far better condition than the glass heretofore disposed between the water coolers above mentioned. The tendency toward the formation of waves due to improper heat treatment is much less with the use of the heated shields 13 than heretofore.

In Fig. 3, a single solid plate 16 is substituted for the internally heated shield 13. The ends of the plates 16 are also dipped beneath the surface of the molten mass from which the sheet is produced. In Fig. 4, the plates are shown in a slightly elevated position so that there is a slight clearance between the surface of the molten glass and the lower edge of the plates. When the plates are dipped into the glass the fires from the cooling chamber and pot chamber will be effectively kept from the sheet during its formative period. These fires being walled off from the glass at the base of the sheet permit any desired adjustment of the same without interfering with drawing of said sheet. Furthermore, these improved shields do away with the necessity of the ordinary sheet coolers which are thought to be the cause of many of the waves in the sheet, while they also cause a sub-surface draw which is considered desirable.

I have found from an actual demonstration that a metallic member can be dipped in the glass on both sides of said sheet as illustrated without cooling said member.

The body of glass between the two plates is practically a distinct body as regards the source of supply so that it can be conditioned without interference from the melting and refining chambers.

It is to be understood that the form of the invention herewith shown and described is to be taken as the preferred embodiment of the same, and that various changes in the shape, size and arrangements of parts may be resorted to without departing from the spirit of the invention or the scope of the subjoined claims.

Claims:

1. In sheet glass apparatus, a receptacle containing a mass of molten glass, means for drawing a sheet therefrom, a metallic shield arranged on each side of the sheet, an end of both shields terminating beneath the surface of the molten glass, and means for internally heating both of said shields.

2. In sheet glass apparatus, a receptacle containing a mass of molten glass, means for drawing a sheet therefrom, a lip-tile arranged over the molten glass, and an internally heated shield disposed between the lip-tile and sheet for protecting the sheet during its formative period.

3. In sheet glass apparatus, a receptacle containing a mass of molten glass, means for drawing a sheet therefrom, a lip-tile arranged over the molten glass, and an internally heated shield disposed between the lip-tile and sheet for protecting the sheet, the lower edge of the shield terminating beneath the surface of the molten glass.

4. In sheet glass apparatus, a receptacle containing a mass of molten glass, means for drawing a sheet therefrom, a lip-tile arranged over the molten glass, and a shield disposed between the lip-tile and sheet for protecting said sheet, the lower edge of the shield terminating beneath the surface of the molten glass.

5. In sheet glass apparatus, a receptacle containing a mass of molten glass, means for drawing a sheet therefrom, a lip-tile arranged over the molten glass, a shield disposed between the lip-tile and sheet for protecting said sheet, the lower edge of the shield terminating beneath the surface of the molten glass, and means for controlling the temperature of said shield.

6. In sheet glass apparatus, a receptacle containing a mass of molten glass, means for drawing a sheet therefrom, and a hollow internally heated shield positioned at the side of said sheet for protecting the same, the wall of the shield adjacent the sheet being imperforate.

7. In sheet glass apparatus, a receptacle containing a mass of molten glass, means for drawing a sheet therefrom, a hollow internally heated shield positioned at the side of said sheet for protecting the same, the wall of the shield adjacent the sheet being imperforate and the lower edge of said shield terminating beneath the surface of the molten glass.

Signed at Lancaster, in the county of Fairfield and State of Ohio, this 2nd day of October, 1926.

NESTOR MAMBOURG.